INVENTORS
George C. Pearce
LeRoy McDonnold
BY Lester M. Miller

Frederick M. Ritchie
Their Attorney

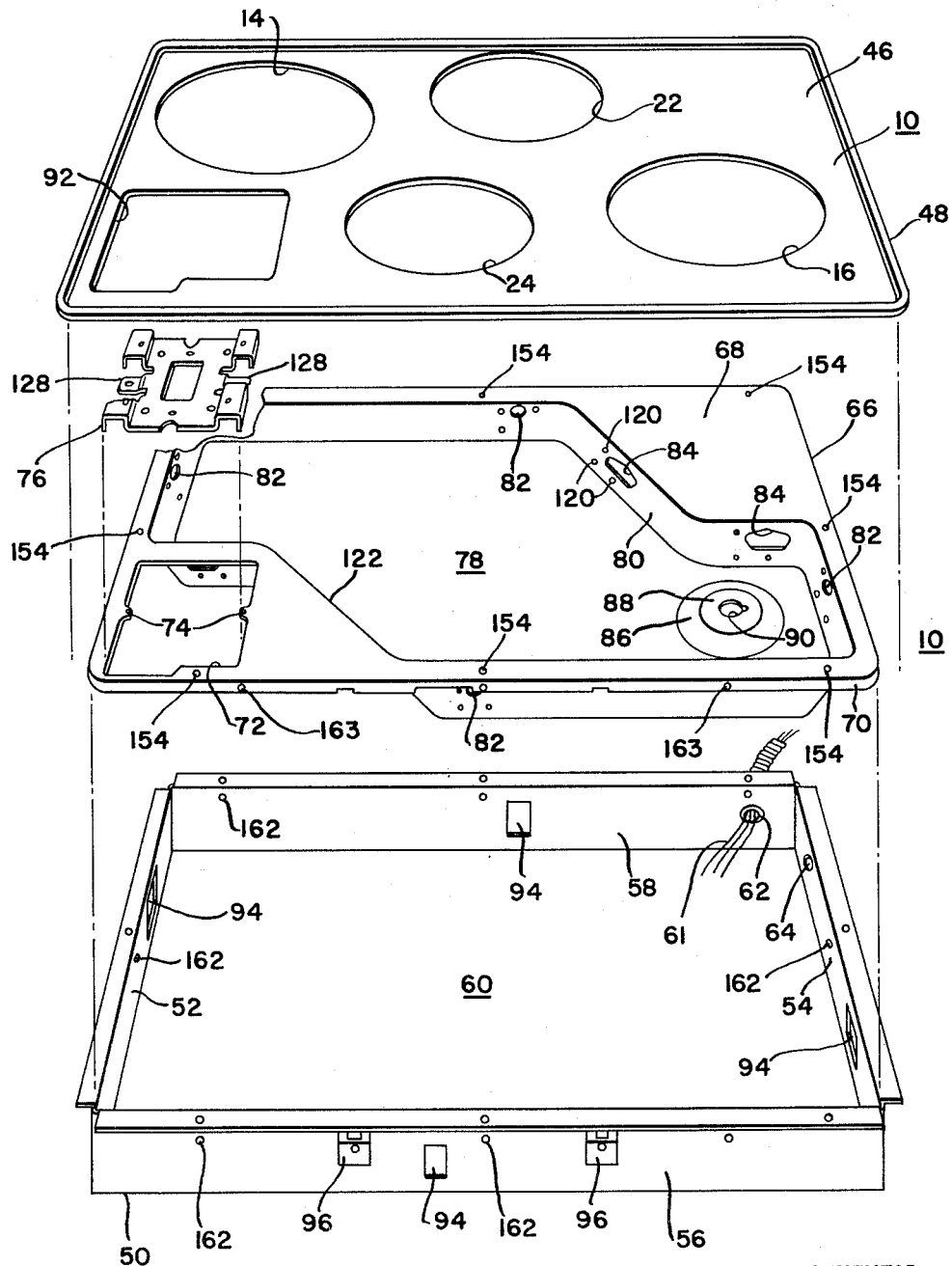

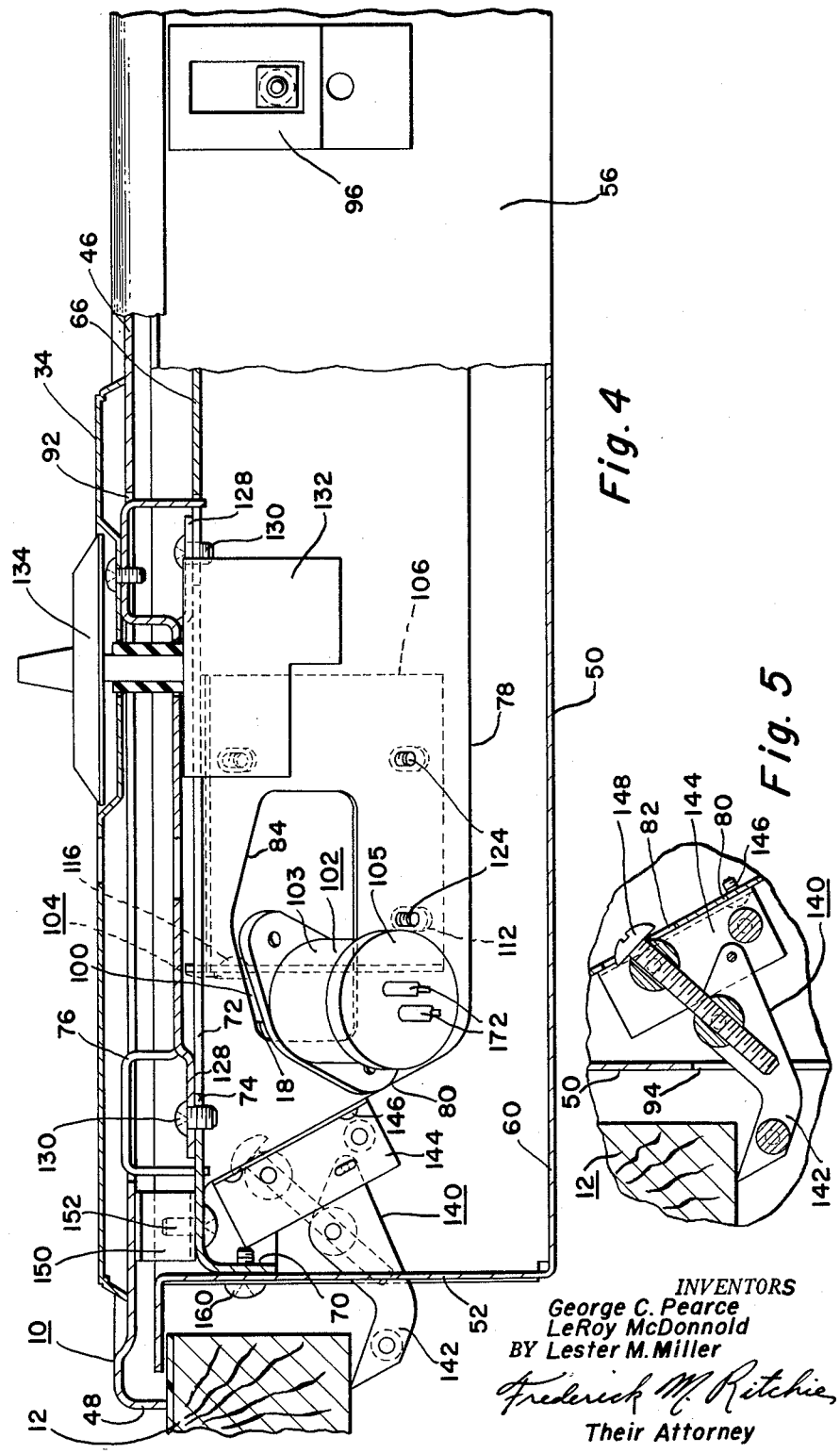

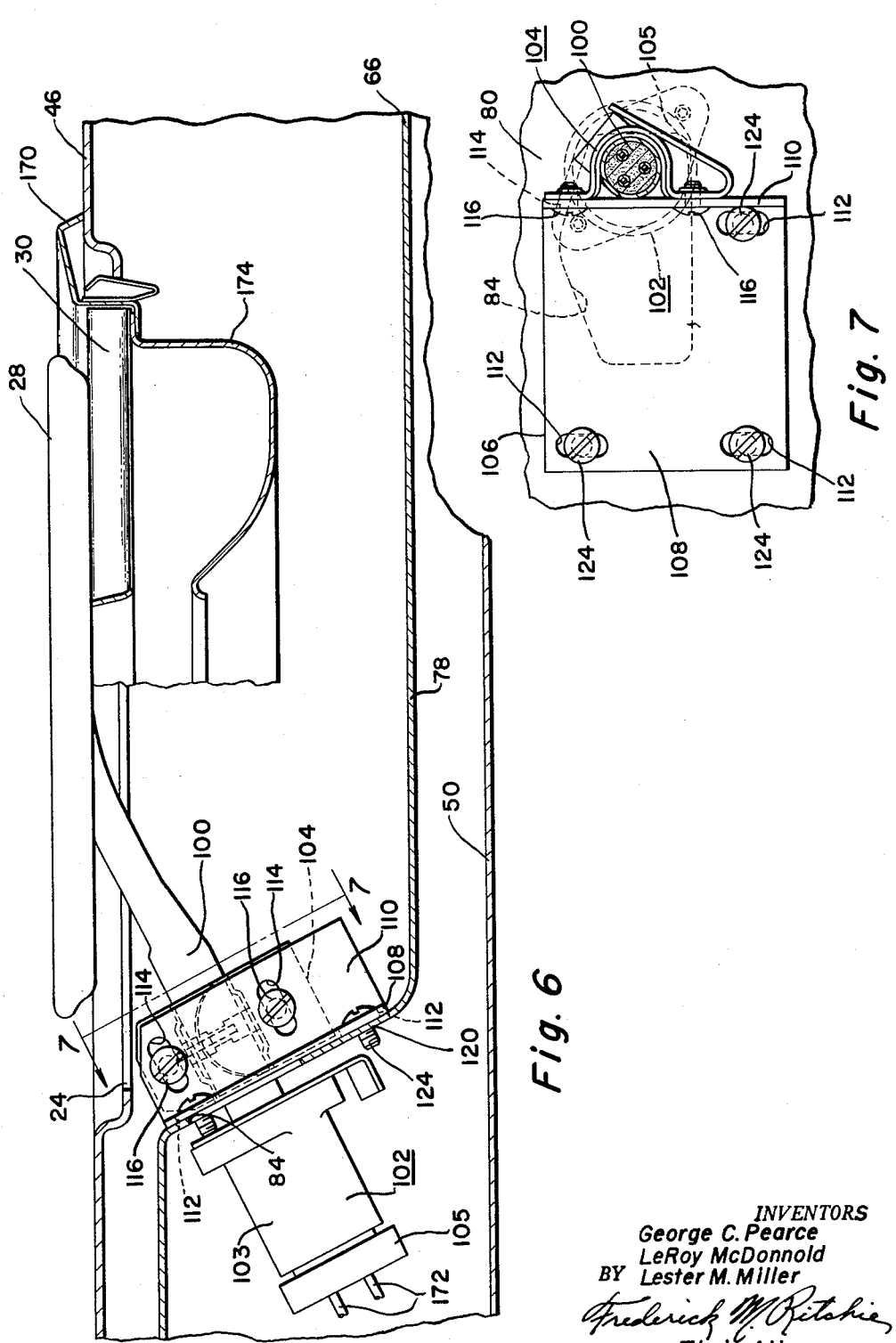

United States Patent Office 3,051,817
Patented Aug. 28, 1962

3,051,817
DOMESTIC APPLIANCE
George C. Pearce, Dayton, Le Roy McDonnold, West Carrollton, and Lester M. Miller, Dayton, Ohio, assignors to General Motors Corporation, Detroit, Mich., a corporation of Delaware
Filed Jan. 28, 1960, Ser. No. 5,267
5 Claims. (Cl. 219—37)

This invention relates to a domestic appliance and more particularly to an improved built-in cooking top.

One of the problems in the development of a satisfactory drop-in cooking top pertains to the control and minimization of temperatures surrounding the cooking top. High housing temperatures discolor the decorative portions of the cooking top as well as blister porcelain area in the neighborhood of the heating element. Further, safety requirements suggest that the electrical conduits for the cooking top be installed in an area which is relatively cool and normally inaccessible to the operator. It is to the solution of these other problems that the present invention is directed.

Accordingly, it is an object of this invention to provide a drop-in or built-in cooking unit in which the surface heating elements are mounted on an intermediate pan.

It is also an object of this invention to provide in a drop-in cooking unit a separate chamber in which the electrical conduits may be installed.

A further object of this invention is the provision of an inner partition in a cooking top for supporting the heating elements and for shielding the radiant heat of the elements from the electrical supply conduits and the counter in which the cooking top is installed.

It is also an object of this invention to provide a drop-in cooking unit in which the top is removable for replacement and color change without disconnecting the wiring leads to the heating elements.

Another object of this invention is the provision of an inner pan in a cooking unit for supporting the heating elements on a sloping wall for purposes of facilitating adjustment.

A general object of this invention is the provision of an inner pan in a drop-in cooking top for adding rigidity to the assembled unit and a base to which the decorative top member may be leveled.

Further objects and advantages of the present invention will be apparent from the following description, reference being had to the accompanying drawings wherein preferred embodiments of the present invention are clearly shown.

In the drawings:

FIG. 3 is an exploded perspective view with parts broken away to show the cooking top assembly;

FIG. 4 is a fragmentary sectional view with parts broken away and taken along line 4—4 in FIG. 1;

FIG. 5 is a fragmentary sectional view of the counter attachment means of this invention;

FIG. 6 is a fragmentary elevational view with parts broken away and taken along line 6—6 in FIG. 1; and FIG. 7 is a fragmentary sectional view taken along line 7—7 in FIG. 6 to show the adjusting means for the heating element of this invention.

Figure 1:
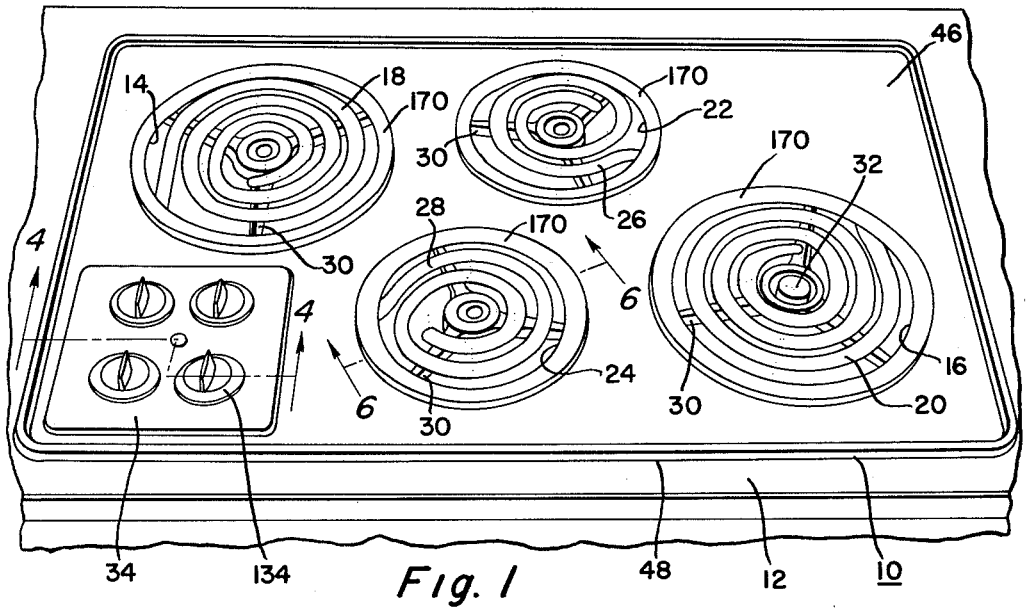
FIG. 1 is a fragmentary perspective view of the drop-in cooking top of this invention.

In accordance with this invention and with reference to FIG. 1 a cooking top is shown generally at 10. The cooking top 10 is adapted to be installed in a counter top 12 and includes openings 14 and 16 for receiving conventional eight-inch heating elements or cooking units 18 and 20. Similarly, smaller openings 22 and 24 are adapted to receive conventioal six-inch heating elements 26 and 28.

As in present electric range devices the coiled element such as 28 is adapted to rest on a support spider such as 30 which, in turn, rests on the top of a drip pan 174 (FIG. 6) disposed below the opening in the cooking top. One of the heating elements, for instance 20, may be provided with a heat responsive device 32 which extends upwardly at the center of the heating element to sense the temperature of a utensil placed on the element. In one corner of the cooking top 10 a control or switch panel 34 may be positioned for operating the appliance, as will be described more fully hereinafter.

Figure 2:
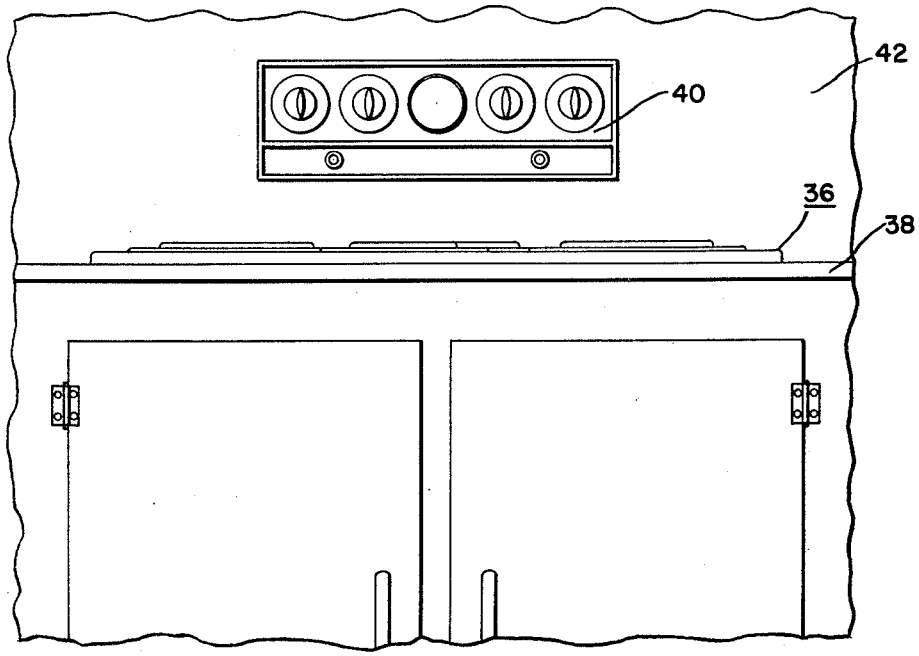
FIG. 2 is a fragmentary perspective view of a modified form of this invention.

Although the cooking unit 10 in FIG. 1 carries the control panel 34 on its top surface, it should be understood that a modified form may include a cooking top 36 with remote control. In the arrangement of FIG. 2 a control panel, such as 40, may be installed in a wall 42 remote from the cooking top 36 which is positioned in a counter top 38.

From an appearance standpoint as evidenced in FIGS. 1 and 2, the cooking tops 10 and 36 appear substantially the same as prior art devices. However, the prior art devices are subject to undesirably high internal temperatures when the heating elements are energized. These elevated temperatures are potentially hazardous where the cooking top is installed in combustible structures such as wooden counter tops. For this reason and with reference to FIG. 3, a novel construction has been proposed which will both reduce surface temperatures at the outer extremities of the cooking top as well as provide a shielded or protected area in which the electrical supply conduits may be installed. More particularly, the cooking top 10 is comprised of a decorative top panel or top cover member 46 having a turned-down peripherally arranged flange 48. The rough-in box or outer housing 50 is comprised of vertical or upstanding end walls 52 and 54, a front wall 56 and a rear wall 58. The generally horizontal bottom wall 60 is imperforate and provides a support for the electrical supply conduits 61. An alternate connecting arrangement is provided so that the supply conduits may enter the box 50 through connector openings 62 or 64.

Interposed between the top panel member 46 and the outer housing 50 is an inner pan or support member 66. The inner pan 66 has substantially the same configuration as the outer housing 50 and is sized so that it may slip on the inside of the housing 50. This inner pan 66 is formed with a substantially flat upper surface 68 terminating in a down-turned flange 70 circumscribing the inner pan. A switch mounting opening 72 is formed in one corner of the inner pan 66 and provided with tabs 74 for attaching a switch mounting bracket 76. The central portion of the inner pan 66 is recessed or dished-out to form a bottom wall 78 which joins the top surface 68 by way of a sloping or inclined attachment wall 80. It is the inclined attachment wall 80 which encircles the recessed bottom wall 78 and which is used to support adjustably the heating elements 18, 20, 26 and 28.

Further, as will be described morefully hereinafter, the inclined wall 80 also supports the clamping means for attaching the cooking unit 10 to a counter top, such as 12. In brief it may be said that the apertures 82 are utilized for access to the adjustment screw 148 of the means for clamping the cooking unit 10 to a counter top 12, whereas openings 84 are provided to receive the terminal ends of the heating elements—the terminal ends extending therethrough for electrically connecting with the electrical supply lines 61. Rising in one corner of the recessed bottom wall 78 is an upwardly extending frusto conical support protuberance 86 which terminates in a flat horizontal wall portion 88. The frusto conical configuration is provided with an opening 90 in the top wall 88 having a keyway for securely locking the heat minder 32 in a proper position relative to the heating element opening 16.

The top member 46 is further provided with an opening 92 in those models having the control switch panel 34 on top as seen in FIG. 1. The opening 92 will align with the opening 72 in the inner pan 66 so that the switch mounting bracket 76 will be exposed when the cooking top 10 is assembled, as will be described in next following. It should be noted that the cooking top attachment clamp adjustment openings 82 align with openings 94 in the vertical walls 52, 54, 56 and 58 of the outer housing 50. Thus, the clamping means 140 can be secured to the inner pan and can extend through the openings 94 to engage the counter top. Ceramic spacers such as 96 are spaced about the exterior of the housing 50 to prevent direct engagement of the assembled unit with the edge of the counter top opening.

The manner in which the heating element is mounted to the inner pan 66 is best seen in FIGURES 4, 6 and 7. Although the mounting arrangement for heating element 28 will be used for purposes of explanation, it should be understood that the mounting of elements 18, 20 and 26 is substantially the same. As is conventional practice, the spiral heating element 28 is provided with a terminal portion 100 which extends into an insulating connector block 102. It is desirable that the heating element 28, as well as the other heating elements 18, 26 and 20, be disposed immediately above and centered in their respective openings 24, 14, 22 and 16 in the top member 46. Further the heating elements should be adapted to pivot to a raised position for cleaning and to a spring biased closed position for operation. A bracket to accomplish these ends is shown in FIGURE 7 and designated generally as 104. Suffice it for this application to state merely that the terminal end portion 100 of the heating element 28 pivots within the arched portion 105 of the bracket 104 and moves between a position wherein the heating element 28 is seated, as shown in FIGURE 6, or raised for access to the inner pan 66 through the opening 24 in the top panel 46. For further details pertaining to the pivotally snap-acting bracket or spring hinge 104 reference may be had to the copending application Serial No. 712,991, filed February 3, 1958, now Patent No. 2,948,801, and assigned to the same assignee.

For attaching or securing the heating element 28 and its pivot bracket 104 to the inner pan 66 an L-shaped attachment or mounting bracket 106 is used. The bracket 106 has a generally rectangular flange portion 108 which is adapted to lie in juxtaposition to the sloping or inclined wall 80. Extending at right angles to the flange 108 is an upstanding flange 110 which mounts the pivot bracket 104.

Universal positioning of the heating elements 18, 20, 26 and 28 is accomplished by adjustment means in which the bracket 106 defines a series of elongated apertures 112 in the flange 108 and elongated openings 114 in the bracket flange portion 110 (see FIGURES 6 and 7). To install the heating elements on the inner pan, the terminal end 110 is placed within the U-shaped or arched portion 105 of the pivot bracket 104 and then the pivot bracket is secured to the flange portion 110 by means of bolts or screws 116. Then the flange portion 108 of the attachment bracket 106 is placed adjacent the inclined wall 80 overlying one of the heating element openings 84. The bracket portion 108 is placed on the upwardly exposed side or inside of the inclined support wall 80 in a manner which places the elongated slots 112 in alignment with the screw attachment ports 120 in the inclined wall. In so aligning the heating element 28 the terminal end 100 and its attached terminal connector block 102 will extend through the opening 84 in the inclined support wall 80. The opening 84 for the heating element 28 is not shown along the wall portion 122 in FIGURE 3 and thus is detailed in the FIGURES 4, 6 and 7. After the elongated ports 112 in bracket portion 108 are aligned with the openings 120 in the support wall 80, fastening means such as bolts 124 are inserted to temporarily position the heating element in support relationship to the inner pan 66. The foregoing procedure then is followed in exactly the same manner for each of the remaining three heating elements 18, 20 and 26.

Following the attachment of the heating elements to the inclined support wall 80 of the inner pan 66, the switch mounting bracket 76 is installed on the inner pan 66 as best seen in FIGURE 4. The mounting bracket 76 is provided with a down-turned flange or tab 128 which is placed in alignment with the ported tabs 74 extending inwardly from the periphery of the opening 72 in the inner pan. Suitable fastening means such as a sheet metal screw 130 may be used to secure the switch mounting bracket 76 to the inner pan. It should be stated, however, that prior to installing the switch mounting bracket to the inner pan 66, the four control switches such as 132 may be attached to the switch mounting bracket 76 to form a subassembly. After the subassembly, including the switches and their mounting bracket, is attached to the inner pan, each switch shaft should project upwardly to receive a knob such as 134 in exposed relationship to the completed cooking top 10.

A clamping means for attaching the cooking top 10 to a counter top 12 is shown generally at 140 and includes a gripping tooth member 142 which extends through an opening 94 in the outer housing 50 to engage the under side of a counter top 12. The attachment clamp 140 includes a support bracket 144 which is fastened as by screws 146 to the outside of the inclined support wall 80. By positioning four of such support brackets 144 adjacent the openings 82 about the inclined wall 80, the adjustment bolt heads 148 are exposed to the inside of the inner pan 66 in a manner which places each screw 148 in a position for easily attaching the cooking top 10 to a counter top. For further details relating to the mounting clamp, reference may be had to the copending application Serial No. 824,055, filed June 30, 1959, now Patent No. 2,955,891, and assigned to the same assignee. Four clamping devices such as 140 spaced on the four sides of the appliance are provided on the inner pan 66 so that the cooking top 10 is held securely seated on the counter top.

To assemble the cooking top 10 the surface units 18, 20, 26 and 28 are fastened to the inner pan 66, each being attached thereto as described above in connection with FIGURES 6 and 7. The switches 132 are secured to the switch mounting bracket 76 and this bracket is secured to the tab 74 of the inner pan 66. Also, as aforesaid, the clamping member 140 is attached to the outside surface of the inclined wall 80 of the inner pan 66. This thus forms a subassembly including the inner pan 66, the heating elements and their pivot hinge brackets, and the clamping or attachment members for the cooking unit 10.

The foregoing inner pan subassembly is then mounted to the top member 46 by means of generally U-shaped brackets 150 which are spot welded to the underside of the top member 46. Fastening means such as a screw 152 may be inserted through the circumferentially arranged openings 154 in the top surface 68 of the inner pan 66. When the fastening means 152 are drawn tight the top member 46 is leveled and secured to the rigid inner pan 66. Due to the configuration of the inner pan with its recessed area 78 and its downturned circumferential flange 70, the subassembly becomes completely rigid and the top or decorative panel portion 46 of the cooking unit is prevented from warping. Such an assembly provides for consistently correct alignment of the cooking unit 10 with the counter top 12. This then becomes the top and inner pan subassembly which is then ready for attachment to the outer housing 50.

The inner pan subassembly is dropped into the outer housing 50 so that the flange 70 of the inner pan 66 lies adjacent the upstanding walls 52, 54, 58 and 56 of the outer housing (FIGURES 3 and 4). The fastening means, such as a bolt 160, are inserted through openings about the upstanding walls of the outer housing 50 and the aligned openings 163 in the flange 70 in the inner pan to secure the entire cooking top 10 in an assembled relationship. The assembled unit is adapted for shipping by turning the adjustment screw 148 until the tooth 142 is withdrawn into the space between outer housing 50 and the inner pan 66. Thus the cooking top 10 is shipped completely ready to insert within a counter top opening. Upon installation the rough-in box or outer housing 50 portion of the cooking top is lowered through the counter top opening until the peripheral flange 48 of the top member 46 abuts the counter top. The cooking or heating elements 18, 20, 26 and 28 are pivoted upwardly to permit access to the adjusting screw 148 which is then turned until the cooking unit 10 is snugly secured to the counter top 12 as shown in FIGURE 4. The cooking top installation is completed by snapping a trim ring such as 170 to each of the heating element openings in the top member 46. The electrical service, of course, is attached to either opening 62 or 64 prior to the insertion of the cooking top into the counter top.

Note in FIGURE 4 that the terminal connector 102 of each heating element extends between the outer housing 50 and the inner pan 66. The connector is comprised of a socket portion 103 and a plug portion 105. Wires, such as 172, extend from the plug portion 105 and may be positioned within an isolated area between the inner pan and the outer housing 50. These wires 172 may extend under the inner pan 66 to the openings 62 or 64 in the outer housing where the power source connects to the cooking top. For further details pertaining to the plug-in terminal connector of this invention reference may be had to the patent to Bremer 2,835,780 issued May 20, 1958.

After the cooking top 10 is completely installed, it should be seen that the heating element 28 is capable of adjustment longitudinally along the axis of terminal portion 100 to center the coiled element above its opening 24—elongated slots 114 being provided for this adjustment. Further, the heating element 28 may be adjusted up and down as well as pivoted through the use of elongated slots 112 in the attachment bracket portion 108 to level the utensil supporting surface of the heating element. In this manner there is effected a universal adjustment which will accommodate any variance in tolerance in the angle between top utensil support surface of the heating element 28 and its terminal portion 100. This is believed a decided advantage over prior art devices wherein attachment of the heating element directly to the top member 46 limits the amount of adjustment possible.

Note with the foregoing improved arrangement it is now possible for an operator to pivot the heating element to a raised position and remove the support spider and the drip bowl to expose the inside of the inner pan 66. Thus the operator may safely clean the inner pan beneath the top 46 without engaging the electrical conduits disposed in an isolated area below the inner pan. Still further, the inner pan 66 provides a barrier wall which limits the transfer of high temperatures surrounding the heating elements from the area within the inner pan and above the recessed bottom 78. This results in lower temperatures at the periphery of the outer housing 50 and thus further enhances the adaptability of the cooking unit 10 to installations in non-fireproof cabinets.

Although the foregoing explanation was made in connection with the cooking unit 10, it should be understood that the remote control cooking top 36 shown in FIGURE 2 includes substantially the same construction. The cooking top 36 merely eliminates the switch panel 34 on its top surface and replaces it with a remote control package such as 40.

While the embodiment of the present invention as herein disclosed, constitute perferred forms, it is to be understood that other forms might be adopted.

What is claimed is as follows:

1. A cooking top adapted for installation in a counter top having an opening and comprising, a top member overlying said counter top and having a heating element aperture, an outer housing having vertical walls insertable within and spaced from said opening, and an inner pan inside said outer housing, said inner pan having a top surface terminating in a downturned peripheral flange fastened to said vertical walls and a recessed bottom integrally connected to said top surface by an inclined attachment wall, a coiled heating element in said aperture and having a terminal portion depending from the plane of said heating element, said attachment wall having a first opening for receiving said terminal portion and a second opening, an attachment means for said heating element having a first portion adjustably attached to one side of said attachment wall and a second portion adjustably attached to said first portion for pivotally mounting said terminal portion and universally positioning said heating element relative to the plane of said heating element aperture, and clamping means secured to the other side of said attachment wall and having an adjustment screw accessible through said second opening and said aperture to manipulate said clamping means for securely attaching said cooking top to said counter top.

2. A cooking top for installation in a counter top opening and comprising, a rough-in box having a bottom wall and a side opening, a top panel member having a heating element opening, an inner pan interposed between said rough-in box and said top member and spaced from the bottom wall of said rough-in box to form a chamber, said inner pan having a wall inclined relative to said heating element opening, a heating element, means on the inclined wall of said inner pan for universally adjustably supporting said heating element within said heating element opening, and attachment means on said inner pan and extending through said side opening for engagement with said counter top.

3. A cooking top for installation in a counter top opening and comprising, a rough-in box having a bottom wall and a side opening, a top panel member having a heating element opening, an inner pan interposed between said rough-in box and said top member and spaced from the bottom wall of said rough-in box to form a chamber, said inner pan having a wall inclined relative to the plane of said heating element opening, a heating element having a terminal end extending through the inclined wall of said inner pan into said chamber, means on the inclined wall of said inner pan for universally adjustably supporting said heating element within said heating element opening, and attachment means on said inner pan and extending through said side opening for engagement with said counter top.

4. A cooking top adapted for installation in a counter top having an opening and comprising, a top member overlying said counter top and having a heating element aperture, an outer housing having vertical walls insertable within and spaced from said opening, and an inner pan inside said outer housing, said inner pan having a top surface terminating in a downturned peripheral flange fastened to said vertical walls and a recessed bottom integrally connected to said top surface by an inclined attachment wall, a heating element in said aperture and having a terminal portion, said inclined attachment wall having a power supply opening for receiving said terminal portion, means for attaching said heating element to said inner pan including a first portion adjustably attached to said inclined attachment wall and a second portion adjustably attached to said first portion for pivotally supporting said terminal portion and universally positioning said heating element relative to the plane of said heating element aperture.

5. A cooking apparatus comprising, an outer frame, a cover member for said outer frame and having an opening, a support member interposed between said outer frame and said cover member, a heating element in said opening, said support member having dimensions in a horizontal plane substantially coextensive with the dimensions of said outer frame and comprising an outer rim underlying said cover member and an inclined side wall defining a central depression for receiving said heating element, and means attached to said side wall and adjustable relative to said side wall for securing said heating element to the side wall of said central depression and for adjusting the plane of said heating element parallel to the plane of said opening.

References Cited in the file of this patent

UNITED STATES PATENTS

| | | |
|---|---|---|
| 2,486,862 | Meyer | Nov. 1, 1949 |
| 2,712,818 | Chambers | July 12, 1955 |
| 2,810,057 | Nolan | Oct. 15, 1957 |
| 2,816,205 | Douden | Dec. 10, 1957 |
| 2,831,955 | Sheidler | Apr. 22, 1958 |
| 2,948,801 | Bremer | Aug. 9, 1960 |
| 2,955,891 | McDonnold | Oct. 11, 1960 |
| 2,992,315 | McDonnold | July 11, 1961 |
| 2,994,317 | More | Aug. 1, 1961 |